(12) United States Patent
Wipiejewski et al.

(10) Patent No.: US 12,693,166 B2
(45) Date of Patent: Jul. 28, 2026

(54) THERMAL RADIATION DETECTION DEVICE AND SYSTEM, AS WELL AS ELECTRONIC DEVICE COMPRISING SUCH A DEVICE OR SYSTEM

(71) Applicant: Huawei Technologies Co., Ltd., Shenzhen (CN)

(72) Inventors: Torsten Wipiejewski, Munich (DE); Zhao Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 716 days.

(21) Appl. No.: 17/919,090

(22) PCT Filed: Apr. 16, 2020

(86) PCT No.: PCT/EP2020/060719
§ 371 (c)(1),
(2) Date: Oct. 14, 2022

(87) PCT Pub. No.: WO2021/209137
PCT Pub. Date: Oct. 21, 2021

(65) Prior Publication Data
US 2023/0184591 A1     Jun. 15, 2023

(51) Int. Cl.
*G01J 5/0821*      (2022.01)
*G01J 5/00*      (2022.01)
(Continued)

(52) U.S. Cl.
CPC ........... *G01J 5/0821* (2013.01); *G01J 5/0025* (2013.01); *G01J 5/0265* (2013.01); *G01J 5/0859* (2013.01);
(Continued)

(58) Field of Classification Search
CPC ...... G01J 5/0821; G01J 5/0265; G01J 5/0025; G01J 5/046; G01J 5/0896; G01J 5/07;
(Continued)

(56) References Cited

U.S. PATENT DOCUMENTS

| | | | | |
|---|---|---|---|---|
| 4,408,827 A | * | 10/1983 | Guthrie | ................. G01J 5/0088 |
| | | | | 374/131 |
| 9,207,398 B2 | | 12/2015 | Gibson et al. | |

(Continued)

FOREIGN PATENT DOCUMENTS

| | | | | |
|---|---|---|---|---|
| GB | 2076988 A | * | 12/1981 | ................ G01J 5/08 |
| JP | S61182532 A | | 8/1986 | |

(Continued)

*Primary Examiner* — Peter J Macchiarolo
*Assistant Examiner* — Mireille S Sadate-Moualeu
(74) *Attorney, Agent, or Firm* — Slater Matsil, LLP

(57)      ABSTRACT

A thermal radiation detection device (1), said device comprising a sensor array (2) comprising a plurality of sensor elements (3) and an optical waveguide (4) having a radiation input end (5) and a radiation output end (6). The radiation input end (5) is configured to receive thermal5 radiation, and the radiation output end (6) is operatively connected to the sensor array (2). The optical waveguide (4) is configured to transmit the received thermal radiation as a plurality of simultaneous thermal radiation signals. By decoupling the sensor array from the radiation input end, the relatively large sensor array can be placed in a position optimal for electronic functionality and optimal in view of mechanical constraints, independent of the radiation input position.

18 Claims, 5 Drawing Sheets

(51) Int. Cl.
    *G01J 5/02*          (2022.01)
    *G01J 5/08*          (2022.01)
    *G01J 5/20*          (2006.01)

(52) U.S. Cl.
    CPC .............. *G01J 5/0896* (2013.01); *G01J 5/20*
            (2013.01); *G01J 5/025* (2013.01); *G01J*
                   *2005/202* (2013.01)

(58) Field of Classification Search
    CPC .. G01J 5/0859; G01J 5/20; G01J 5/025; G01J
                           2005/202
    USPC .................................................. 374/100, 131
    See application file for complete search history.

(56)                 References Cited

U.S. PATENT DOCUMENTS

| | | |
|---|---|---|
| 10,261,011 B2 | 4/2019 | Bauer et al. |
| 2005/0140270 A1* | 6/2005 | Henson ................... F21V 29/70 |
| | | 313/501 |
| 2020/0064199 A1 | 2/2020 | Magel et al. |
| 2023/0184591 A1 | 6/2023 | Wipiejewski et al. |

FOREIGN PATENT DOCUMENTS

| | | | |
|---|---|---|---|
| JP | 2012231309 A | 11/2012 | |
| WO | 9629925 A2 | 10/1996 | |

* cited by examiner

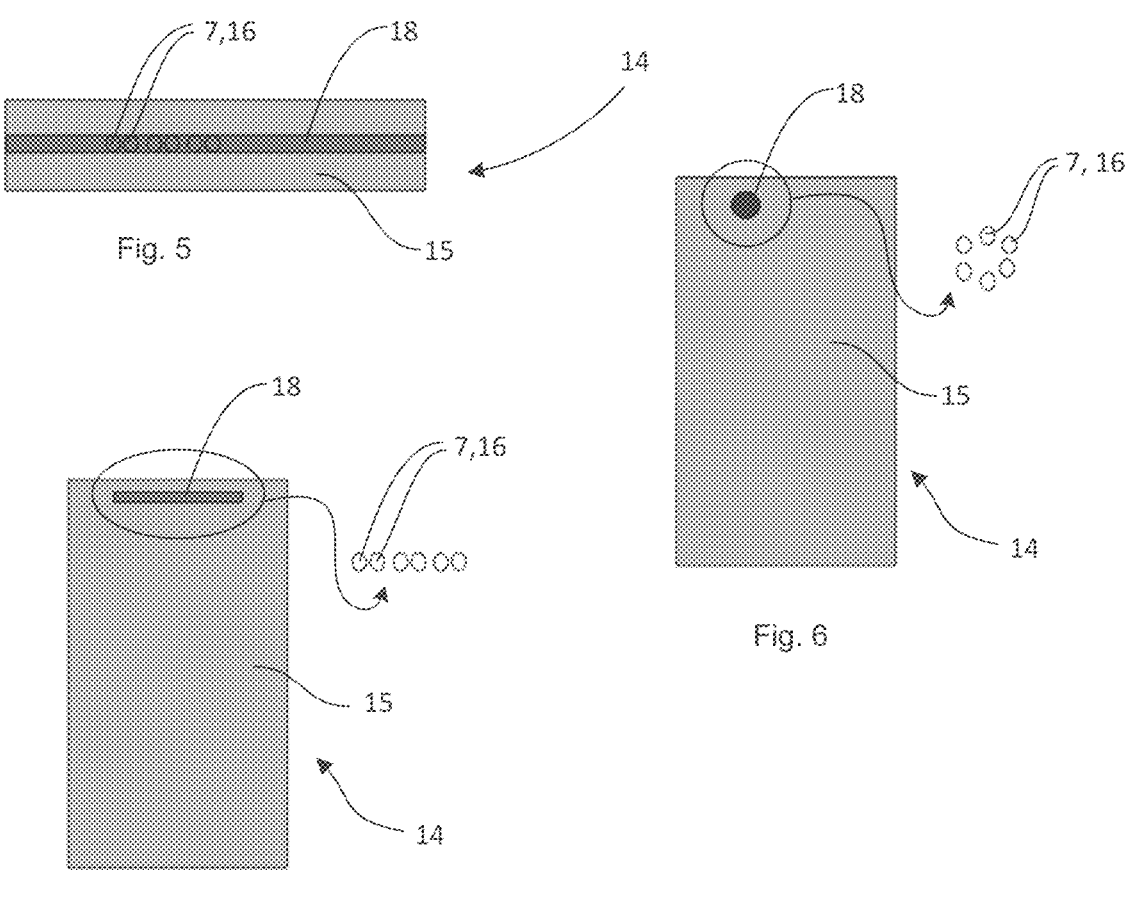
Fig. 5
Fig. 6
Fig. 7
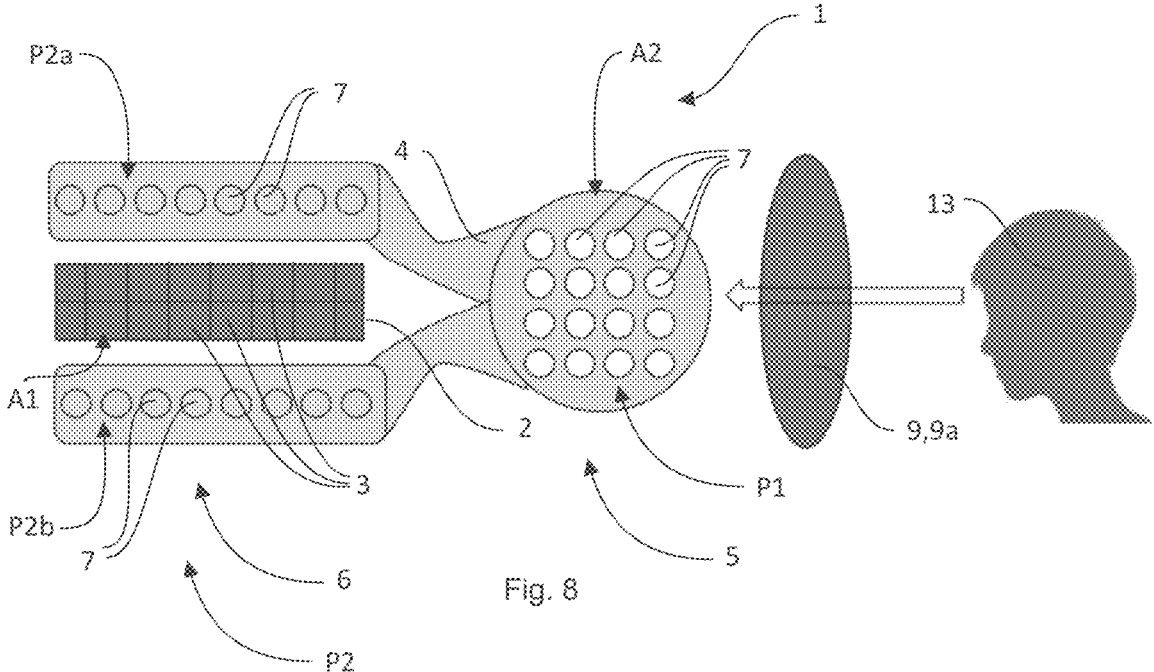
Fig. 8

THERMAL RADIATION DETECTION DEVICE AND SYSTEM, AS WELL AS ELECTRONIC DEVICE COMPRISING SUCH A DEVICE OR SYSTEM

CROSS-REFERENCE TO RELATED APPLICATIONS

This application is a National Stage of International Application No. PCT/EP2020/060719, filed on Apr. 16, 2020, which is hereby incorporated by reference in its entirety.

TECHNICAL FIELD

The disclosure relates to a thermal radiation detection device comprising an optical waveguide, a thermal radiation detection system comprising such a thermal radiation detection device, and an electronic device comprising one of the thermal radiation detection device and the thermal radiation detection system.

BACKGROUND

Electronic devices for non-contact temperature measurement, such as digital thermometers, often use thermal radiation sensitive devices in the form of thermopile mid-infrared range temperature sensors. Such infrared sensors are typically packaged in a so-called TO-can or a SMT (surface mount technology) package in order to provide environmental protection and ease of handling. The semiconductor chips, i.e. the thermal sensor elements of the device, are sealed in the package with a window on top. This is associated with several problems, at least as far as regards use in small and/or multifunctional electronic devices such as smartphones or smartwatches.

One issue is that the thermal sensor elements must be arranged adjacent to an opening in the surface of the electronic device, and directed to face the area where temperature should be measured. This puts constraints on the mechanical design used for the integration of the thermal sensor elements, and also on the outer appearance of the electronic device. In particular, the outside facing surface of an electronic device such as a smartphone comprises other components such as large size displays and antennas, or favors aesthetic designs such as "full display" or "bezel/notch-less phones". Hence, the space needed for such thermal sensor elements and other related components, as well as the size of the opening in the device surface, should be minimized. However, infrared sensors are difficult, if not impossible, to make sufficiently small. For example, current SMT packages are at least a few millimeters in size.

Additionally, the temperature measurement area is typically in front of the sensor device. For many handheld applications, this can be considered in the mechanical design of the device. However, when integrating the sensor device into other small size products, such as smartphones, this might be a major drawback. The limitations of such a small device might require the thermal sensor elements to be placed next to a heat source inside the electronic device, which can cause interference with the temperature measurement.

A further issue is that, if placing the sensor elements directly by an opening in the electronic device, the performance of the sensor device, and hence the act of non-contact temperature measurement, is left vulnerable to the outside environment.

SUMMARY

It is an object to provide an improved thermal radiation detection device. The foregoing and other objects are achieved by the features of the independent claim(s). Further implementation forms are apparent from the dependent claims, the description, and the figures.

According to a first aspect, there is provided a thermal radiation detection device, the device comprising a sensor array comprising a plurality of sensor elements and an optical waveguide having a radiation input end and a radiation output end, the radiation input end being configured to receive thermal radiation and the radiation output end being operatively connected to the sensor array, wherein the optical waveguide is configured to transmit the received thermal radiation as a plurality of simultaneous thermal radiation signals.

By such a solution, the position of the sensor array is decoupled from the radiation input position. An optical waveguide is used to transmit the input thermal radiation to the sensor array. This allows the sensor array to be placed in a position optimal for electronic functionality and optimal in view of mechanical constraints, independent of the radiation input position. Furthermore, the size of the sensor array is no longer a significant limiting factor, since it may be placed wherever suitable within an electronic device. Also, by transmitting a plurality of simultaneous thermal radiation signals, the spatial resolution of the temperature distribution is improved, and the strength of the total signal increased.

In a possible implementation form of the first aspect, the plurality of thermal radiation signals are continuously transmitted to the sensor array as long as thermal radiation is received by the optical waveguide such that the thermal radiation detection is performed in continuous mode.

In a further possible implementation form of the first aspect, the device 1s configured to detect thermal radiation having wavelengths within the infrared spectrum and/or the visible spectrum, allowing a wide variety of possible uses.

In a further possible implementation form of the first aspect, the wavelength is in the mid-infrared spectrum, preferably between 5 and 14 μm, allowing the most common mode of temperature detection to be used.

In a further possible implementation form of the first aspect, the sensor array has a surface area which is at least the same size as a corresponding area of the optical waveguide. This allows the sensor array to have its necessary size, while allowing the smaller optical waveguide to extend e.g. through small gaps within an electronic device.

In a further possible implementation form of the first aspect, each sensor element is a semiconductor element, preferably one of a thermopile temperature sensor or a bolometer.

In a further possible implementation form of the first aspect, the optical waveguide has an optical loss of less than 20 dB/cm, preferably less than 10 dB/cm, facilitating an as correct temperature measurement as possible.

In a further possible implementation form of the first aspect, the optical waveguide comprises at least one bundle of monocore fibers allowing very small individual fibers to extend wherever possible within an electronic device.

In a further possible implementation form of the first aspect, the optical waveguide comprises at least one multicore fiber, enabling an optical waveguide having a small diameter.

In a further possible implementation form of the first aspect, each core of the multicore fiber is surrounded by a cladding, the core having a higher refractive index than the cladding. This facilitates efficient transmission of radiation signals In a further possible implementation form of the first aspect, the optical waveguide comprises at least one of AgBr, AgBrCl, Si, Ge, ZnSe or ZnS.

In a further possible implementation form of the first aspect, the multicore fiber comprises a plurality of AgBr cores and AgBrCl cladding.

In a further possible implementation form of the first aspect, each core of the multicore fiber, or each core of the bundle of monocore fibers, is operably connected to one sensor element, each core being configured to transmit one thermal radiation signal to one sensor element. Also, by transmitting a plurality of signals to a plurality of sensor elements, the spatial resolution of the temperature distribution is improved, and the strength of the total signal increased.

In a further possible implementation form of the first aspect, the cores of the multicore fiber are arranged in a first two-dimensional pattern at the radiation input end, and in a second two-dimensional pattern at the radiation output end, allowing the interface between the optical waveguide and the sensor array to be executed in a variety of ways.

In a further possible implementation form of the first aspect, the radiation output end is arranged to at least partially enclose the sensor array, the second two-dimensional pattern being divided into a first sub-pattern and a second sub-pattern, the first sub-pattern being superimposed onto a first side of the sensor array and the second sub-pattern being superimposed onto a second, opposite side of the sensor array. This allows the height of the device to be reduced, and makes its configuration more flexible, since sensor elements may be arranged in e.g. a stacked configuration.

In a further possible implementation form of the first aspect, the first two-dimensional pattern and/or the second two-dimensional pattern is one of a rectangular and a circular core pattern, and/or the first sub-pattern and the second sub-pattern is one of a two-dimensional rectangular or circular core pattern and a one-dimensional linear pattern.

In a further possible implementation form of the first aspect, at least one of the radiation input end and the radiation output end of the optical waveguide comprises a reflective surface, a main plane of the reflective surface extending at a first angle to a main thermal radiation path of the optical waveguide, the reflective surface being configured to fold the thermal radiation path by a second angle within the optical waveguide. By folding the thermal radiation path, the device can be made to have a very small height and/or other components may be maneuvered around.

In a further possible implementation form of the first aspect, the first angle is between 35-55°, preferably 45°, and/or the second angle is between 80-100°, preferably 90°.

In a further possible implementation form of the first aspect, the reflective surface comprises at least one of a polished surface and a reflective coating.

In a further possible implementation form of the first aspect, the reflective coating being a metal coating, such as gold and aluminium.

In a further possible implementation form of the first aspect, the thermal radiation detection device further comprises at least one lens arrangement arranged adjacent to the radiation input end and/or the radiation output end of the optical waveguide, such that the thermal radiation is transmitted to the optical waveguide, at the radiation input end, by means of an input lens arrangement, and/or the thermal radiation signals are transmitted to the sensor array, at the radiation output end, via an output lens arrangement. This improves imaging and light collection at the radiation input end as well as between the radiation output end and the sensor array.

In a further possible implementation form of the first aspect, the lens arrangement comprises at least one lens, the lens preferably comprising at least one of ZnSe, Ge, Si, AgBr, AgCl, or alloys thereof. This allows the lens arrangement to be adapted to specific needs, and allows infrared light to be transmitted through the lens arrangement.

According to a second aspect, there is provided a thermal radiation detection system comprising a thermal radiation detection device according the above, and a camera and/or a guiding light source, the camera and/or guiding light source being arranged such that an optical axis of the camera and/or an optical axis of the guiding light source is located at a maximum distance of 2.5 cm from a center axis of the optical waveguide of the thermal radiation detection device. By enabling very close positioning of the camera, and/or guiding light source, and the radiation input end of the thermal radiation detection device, there is very small geometrical displacement between them, so that the camera and/or guiding light source can accurately guide to actual area for thermal measurement, when in the camera view mode. This allows the user to easily choose the correct area for temperature measurement, for instance by choosing the forehead or by avoiding blocking elements such as hair or accessories.

In a possible implementation form of the second aspect, the guiding light source is configured to emit infrared or visible light, allowing the act of measuring to go either undetected or detected, as desired.

In a further possible implementation form of the second aspect, the camera and/or the guiding light source is configured to provide directional guidance to a user of the system, such that the optical waveguide can be oriented to receive thermal radiation emitted only from a predefined area on a radiation source, preventing unwanted or incorrect radiation from affecting the measurement.

According to a third aspect, there is provided an electronic device comprising a housing and a thermal radiation detection device according to the above, or a thermal radiation detection system according to the above, the housing enclosing the thermal radiation detection device or the thermal radiation detection system, the housing being provided with at least one thermally transparent opening, the transparent opening being transparent to thermal radiation emitted by a radiation source located outside the housing, wherein being transparent to thermal radiation means allowing thermal radiation pass the transparent opening without substantial abortion of the thermal radiation or without substantial loss of thermal radiation energy, the transparent opening being aligned with the radiation input end of the optical waveguide of the thermal radiation detection device or the thermal radiation detection system, such that the thermal radiation is transmitted to the optical waveguide via the transparent opening. By decoupling the sensor array from the radiation input position, the sensor array can be placed in a position optimal for electronic functionality and in view of mechanical constraints, independently from the radiation input position. Furthermore, the size of the sensor array is no longer a significant limiting factor, since it may be placed wherever suitable within an electronic device. Furthermore, by aligning the transparent opening with the radiation input end, only a very small transparent opening in the housing may be necessary.

In a possible implementation form of the third aspect, the electronic device 1s a portable electronic device such as a smartphone, a smart watch, or a smart band, facilitating temperature measurement whenever needed.

In a further possible implementation form of the third aspect, the transparent opening is sealed by a cover, the cover comprising at least one of Si, Ge, and ZnSe. This provides the housing with an integral appearance, and protects the interior of the device from dust and dirt.

In a further possible implementation form of the third aspect, the cover is transparent to wavelengths in the mid-infrared spectrum, preferably wavelengths between 5 and 14 µm.

In a further possible implementation form of the third aspect, the transparent opening is arranged within a further opening in the housing, such as a further opening accommodating the camera, a microphone, a light sensor, and/or an IR emitter, the further opening having at least the same area size as the transparent opening. Such a solution does not require additional openings to be made, but rather use existing openings for the additional purpose of temperature detection.

In a further possible implementation form of the third aspect, the transparent opening comprises an array of transparent sub-openings, the transparent sub-openings being arranged in a two-dimensional pattern corresponding to the first two-dimensional pattern of the radiation input end of the optical waveguide, such that the thermal radiation is transmitted to the optical waveguide via the transparent sub-openings. This allows each individual sub-openings to be as small as possible, corresponding in size only to the size of the individual cores of the optical waveguide.

In a further possible implementation form of the third aspect, each transparent sub-opening tapers through the housing, such that a smallest dimension of the transparent sub-opening is arranged closest to the radiation input end of the optical waveguide, allowing thermal radiation to be received by the optical waveguide at an as large field of view angle α is possible, while keeping the diameter of the optical waveguide as small as possible.

In a further possible implementation form of the third aspect, each transparent sub-opening has a height and a diameter, the transparent sub-opening tapering such that the thermal radiation is received by the optical waveguide at a maximum field of view angle=2×arctan D/2×H.

In a further possible implementation form of the third aspect, the electronic device further comprises a printed circuit board, the sensor array of the thermal radiation detection device or the thermal radiation detection system being arranged on the printed circuit board. This allows the sensor array to be placed in a position optimal for electronic functionality and in view of mechanical constraints, independently from the radiation input position.

In a further possible implementation form of the third aspect, the optical waveguide extends such that a thermal radiation path of the optical waveguide is parallel with a main plane of the printed circuit board, allowing the thermal radiation detection device to have a very low height and, hence, very little influence on the arrangement of the other components of the electronic device.

These and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIGS. 5 to 7 illustrate electronic devices in accordance with embodiments of the present invention, and the placement of the thermal radiation detection device;

FIG. 8 shows a schematic illustration of a thermal radiation detection device in accordance with an embodiment of the present invention;

DETAILED DESCRIPTION OF ILLUSTRATIVE EMBODIMENTS

Figures 1, 2, 3, 4:
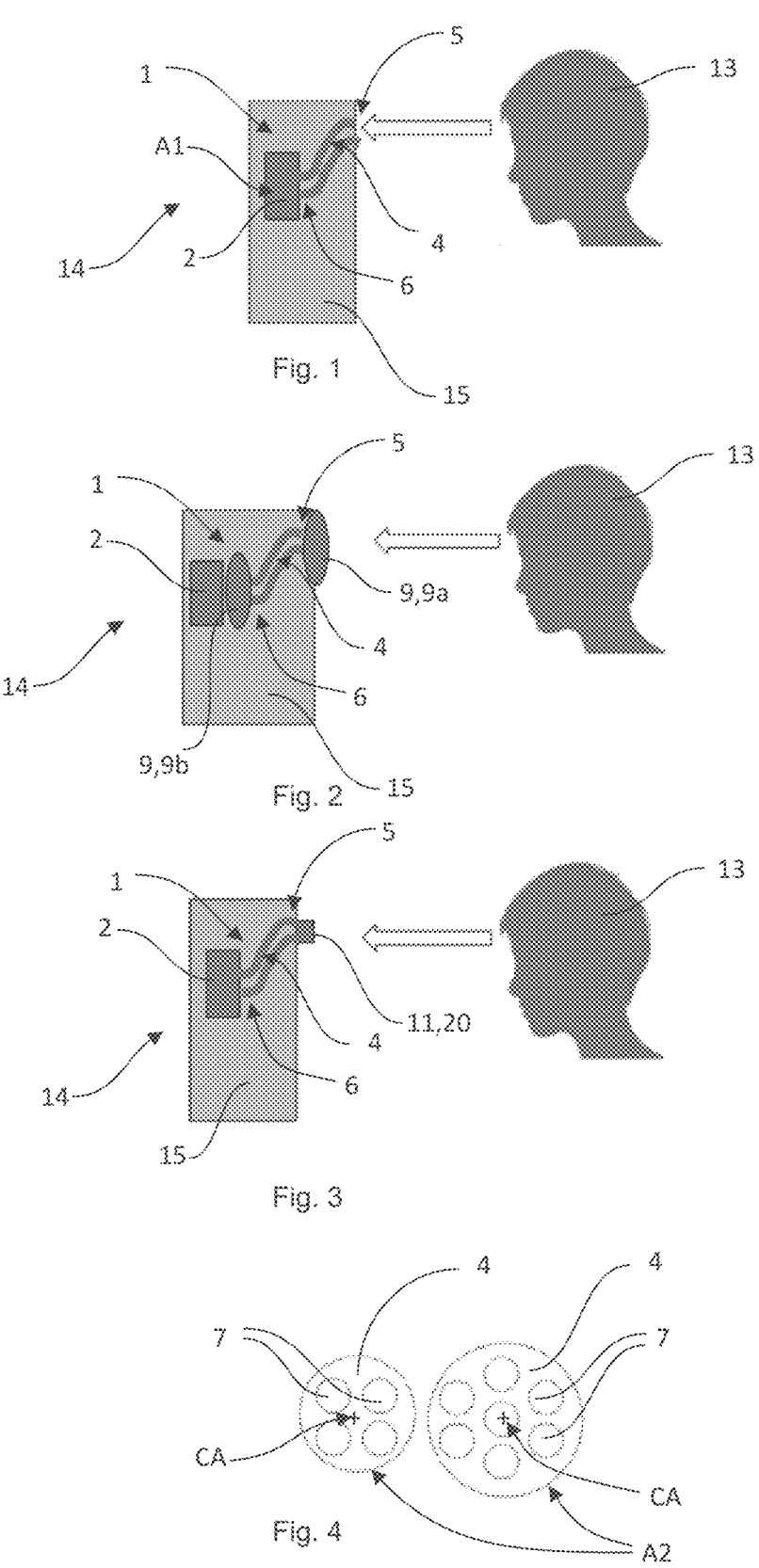
FIGS. 1 to 3 illustrate electronic devices in accordance with embodiments of the present invention.
FIG. 4 shows cross-sections of two optical waveguides in accordance with embodiments of the present invention.
Figure 13A:
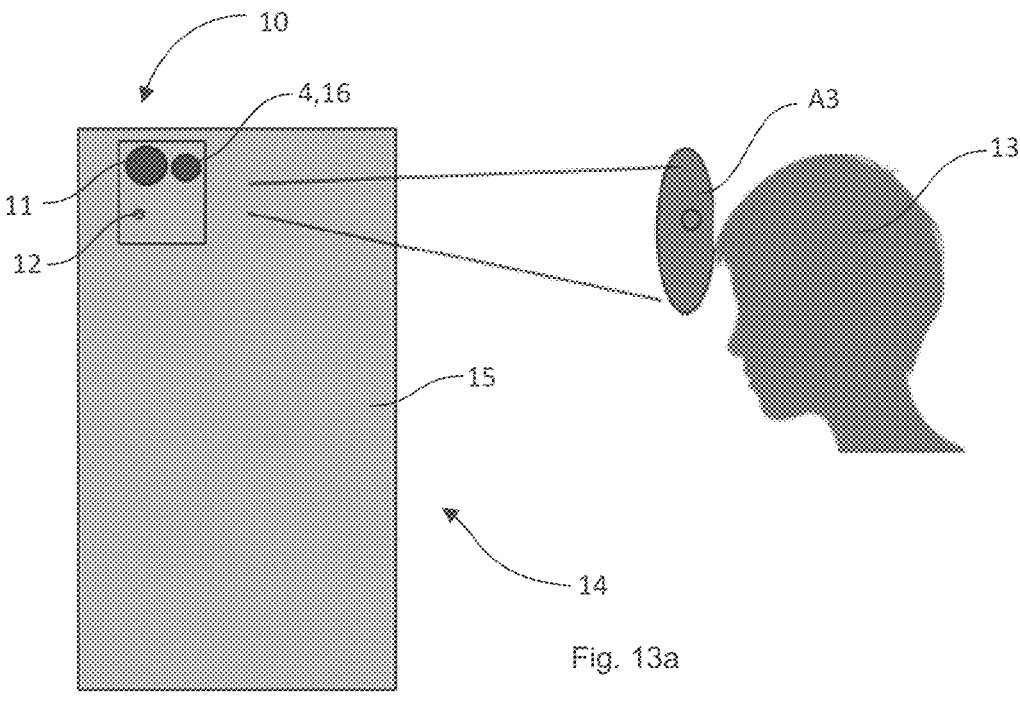
FIGS. 13a to 13c show schematic illustrations of a thermal radiation detection system in accordance with an embodiment of the present invention.
Figure 13B:
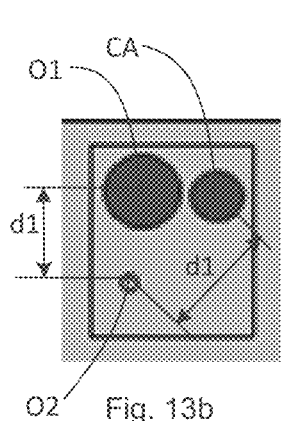
Figure 13C:
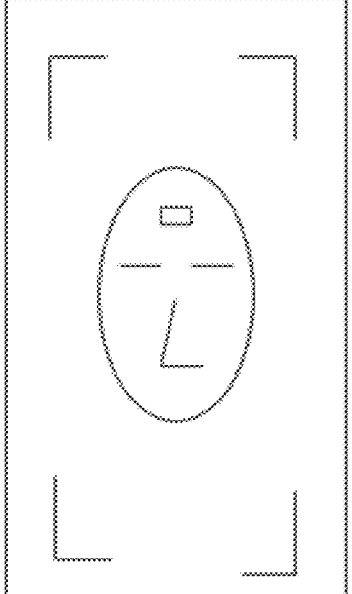

FIGS. 1 to 3 show schematic illustrations of embodiments of a thermal radiation detection device 1. FIGS. 13a to 13c show schematic illustrations of a thermal radiation detection system 10 comprising the thermal radiation detection device 1. The device 1 and/or the system 10 are preferably arranged in an electronic device 14, preferably a portable electronic device 14 such as a smartphone, a smart watch, a smart band or a laptop/notebook. The device 1 and/or the system 10 may, however, be placed in any suitable electronic device 14 such as an electronic thermometer or any other electronic scanning device.

The thermal radiation detection device 1 comprises, at least, a sensor array 2 and an optical waveguide 4.

The sensor array 2 comprises a plurality of sensor elements 3. The sensor elements 3 are arranged in whatever way suits the specific electronic device, nevertheless, one example of a stacked arrangement is shown in FIG. 8. The sensor elements 3 may be located in one plane (not shown) or in several stacked planes, as shown in FIG. 8.

The sensor elements 3 may be semiconductor elements such as thermopile temperature sensors or bolometers.

Figure 9:
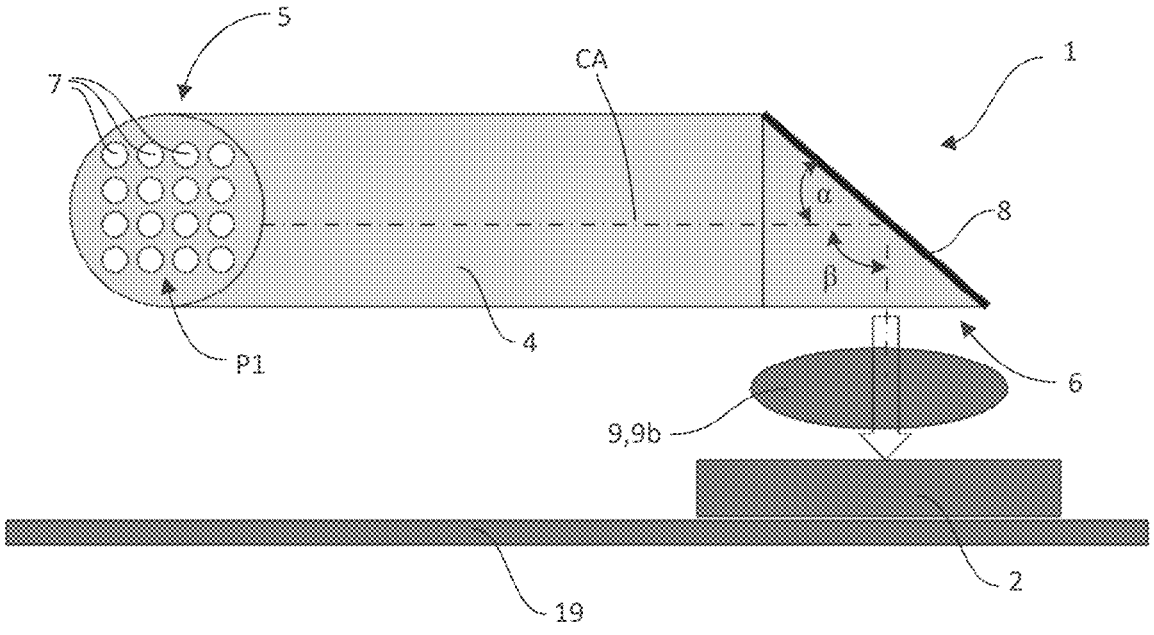
FIGS. 9 and 10 show schematic illustrations of thermal radiation detection devices in accordance with embodiments of the present invention.

Preferably, the sensor array 2 is arranged on the printed circuit board 19 of the electronic device 14, as shown in FIG. 9. With such an arrangement, the optical waveguide 4 may extend such that the thermal radiation path of the optical waveguide 4 is parallel with the main plane of the printed circuit board 19, as also shown in FIG. 9, allowing the thermal radiation detection device 1 to have a very low height since the optical waveguide 4 does not need to extend perpendicular to the printed circuit board 19 and/or the housing 15 of the electronic device 14. Hence, the thermal radiation detection device 1 has very little impact on the arrangement of the other components of the electronic device 14.

The optical waveguide 4 has a radiation input end 5 and a radiation output end 6, such that the thermal radiation path of the optical waveguide 4 extends from the radiation input end 5 to the radiation output end 6. The radiation input end 5 is configured to receive thermal radiation emitted by a radiation source, i.e. an exterior object such as a human body or a further device. The radiation output end 6 is operatively connected to at least one, or a plurality of or all of the sensor elements 3 of the sensor array 2. The radiation input end 5 and the radiation output end 6 may comprise further components, however, the radiation input end 5 and the radiation output end 6 preferably comprise opposite, open, and radiation transparent facets cut through the optical waveguide 4.

The facet of the radiation output end 6 may be placed above, and aligned with, the sensor elements 3 of the sensor array 2 such that each core 7 of the optical waveguide 4 aligns with one sensor element 3. This is known as a butt-coupling. The butt-coupling may be facilitated by means of a mechanical fixture such as a cylindrical or V-shaped mechanical element configured to place and maintain the radiation output end 6 in the correct position relative to the sensor array 2. Correspondingly, a similar mechanical fixture may be used to place and maintain the radiation input end 5 in the correct position relative, e.g., a thermally transparent opening 16 in a housing 15 of an electronic device 14.

The optical waveguide 4 is configured to transmit the thermal radiation which is received at the radiation input end 5, as a plurality of simultaneous thermal radiation signals, along the thermal radiation path to the radiation output end 6. One thermal radiation signal is transmitted to each sensor element 3. The plurality of thermal radiation signals are continuously transmitted to the sensor array 2 as thermal radiation is being received by the optical waveguide 4. This allows thermal radiation detection to be performed in continuously. Preferably, the electronic device 14 comprises an activation arrangement for turning the thermal radiation detection on and off (not shown).

The thermal radiation detection device 1 is configured to detect thermal radiation having wavelengths within the infrared spectrum and/or the visible spectrum. The infrared wavelengths are preferably in the mid-infrared spectrum, more preferably between 5 and 14 μm. To ensure only the desired radiation is detected, the thermal radiation detection device 1 may be provided with radiation isolation arrangement (not shown), which is configured to shield the sensor array 2 off from the environment and ensure only radiation from the optical waveguide 4 is transferred to the sensor array 2. The radiation isolation arrangement is preferably arranged on/around the sensor array 2 or the optical waveguide 4, and may comprise a metal element and/or a coating.

The optical waveguide 4 may comprise at least one bundle of monocore fibers, i.e. a plurality of monocore fibers, or at least one multicore fiber. Each monocore fiber comprises only one core 7 (not shown), and each multicore comprises a plurality of cores 7, as shown in FIG. 4. Each core 7 is preferably surrounded by a cladding and has a higher refractive index than the cladding.

The optical waveguide 4 may comprise any suitable material(s), preferably at least one of AgBr, AgBrCl, Si, Ge, ZnSe, or ZnS. Preferably, the optical waveguide 4 comprises materials allowing it to have an optical loss of less than 20 dB/cm, preferably less than 10 dB/cm.

The multicore fiber of the optical waveguide 4 comprises at least two cores 7, such as four, or seven cores 7, as shown in FIG. 4, or for example nineteen cores 7. The cores 7 may be arranged in patterns comprising 4×4 cores, 6×6 cores, 8×8 cores, 16×16 cores, or even more cores 7. The multicore fiber of the said optical waveguide 4 may comprise hundreds or thousands of cores 7, the number of cores 7 can be adapted to a specific need and specific electronic device 14 which the thermal radiation detection device 1 is to be used in. In one embodiment, the multicore fiber of the said optical waveguide 4 comprises a plurality of cores 7 made of AgBr, and a surrounding cladding made of AgBrCl.

Each core 7 of the multicore fiber of the said optical waveguide 4, or each core 7 of the bundle of monocore fibers of the said optical waveguide 4, is operably connected to one sensor element 3, each core 7 being configured to transmit one thermal radiation signal to one sensor element 3. In other words, the radiation output end 6 may be superimposed onto the sensor array 2 such that each core 7 aligns with one sensor element 7. This is shown in FIG. 8.

In one embodiment, the sensor array 2 has a surface area A1 which is at least the same size as a corresponding area A2 of the optical waveguide 4, i.e. the main cross-sectional area A2 of the optical waveguide 4 is preferably smaller than the surface area A1 of the sensor array 2. In such an embodiment, the radiation output end 6 of the optical waveguide 4 is divided into smaller end sections such that the radiation output end 6 can be superimposed onto the larger area A1 of the sensor array 2. For example, the optical waveguide 4 may comprise several monocore fibers or several multicore fibers, each fiber being led to a different part of the surface area A1 of the sensor array 2. As a further example, the optical waveguide 4 may comprise one multicore fiber, each core 7 of the fiber being led to a different part of the surface area A1 of the sensor array 2.

The cores 7 of the multicore fiber(s) of the optical waveguide 4 may be arranged in a first two-dimensional pattern P1 at the radiation input end 5, and in a second two-dimensional pattern P2 at the radiation output end 6, allowing the interface between optical waveguide 4 and sensor array 2 to be executed in a variety of ways, independently of the cross-section and core configuration of the optical waveguide 4. For example, the first two-dimensional pattern P1 may be arranged in both dimensions, as suggested by FIGS. 4 and 8, while the second two-dimensional pattern P2 may be flattened out to a one-dimensional linear pattern, e.g. allowing the radiation output end 6 of the optical waveguide 4 to be inserted into areas of very limited height. The opposite configuration is also possible. The first two-dimensional pattern P1 and/or the second two-dimensional pattern P2 may have any shape suitable such as a rectangular core pattern (including a one dimensional linear pattern) or a circular core pattern, both embodiments being shown in FIG. 4. For example, the first two-dimensional pattern P1 may be a 4×4 core pattern, and the second two-dimensional pattern P2 may be a 1×16 core pattern, or a 2×8 core pattern as shown in FIG. 8.

The radiation output end 6 of the optical waveguide 4 may be arranged to at least partially enclose the sensor array 2, as shown in FIG. 8. The second two-dimensional pattern P2 may in this case be divided into a first sub-pattern P2a and a second sub-pattern P2b, the first sub-pattern P2a being superimposed onto a first side of the sensor array 2, connecting to a first set of sensor elements 3, and the second sub-pattern P2b may be superimposed onto a second, opposite side of the sensor array 2, connecting to a second set of sensor elements 3.

Figure 10:
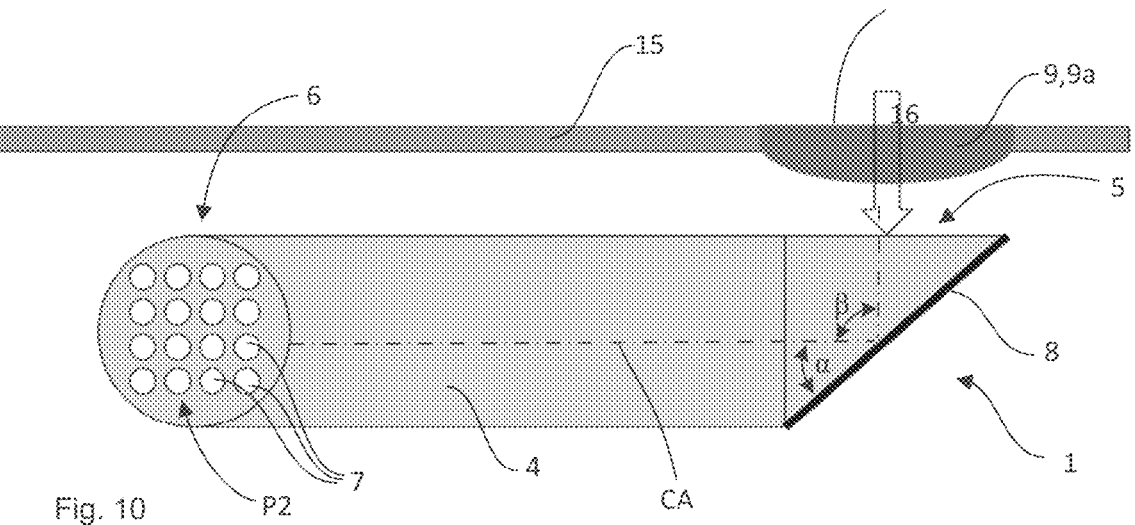

The first sub-pattern P2a and the second sub-pattern P2b may be a two-dimensional rectangular core pattern (not shown) or a two-dimensional circular core pattern, as shown in FIG. 10, or a one-dimensional linear pattern, as shown in FIG. 8. For example, the first sub-pattern P2a and the second sub-pattern P2b may both be 1×8 core patterns, as shown in FIG. 8.

In a further embodiment, at least one of the radiation input end 5 and the radiation output end 6 of the optical waveguide 4 comprises a reflective surface 8. The reflective surface 8 is arranged such that a main plane of the reflective surface 8 extends at a first angle α to the main thermal radiation path of the optical waveguide 4. Hence, the reflective surface 8 is configured to fold or change the thermal radiation path by a second angle β within the optical waveguide 4. The first angle α may be between 35-55°, preferably 45° as shown in FIGS. 9 and 10, and the second angle β may be between 80-100°, preferably 90° as also shown in FIGS. 9 and 10. The reflective surface 8 may comprise at least one of a polished surface and/or a reflective coating. The reflective coating may be a metal coating, such as gold or aluminium. FIG. 9 shows a reflective surface 8 arranged adjacent to the radiation output end 6 of the optical waveguide 4. FIG. 10 shows a reflective surface 8 arranged adjacent to the radiation input end 5 of the optical waveguide 4.

The thermal radiation detection device 1 may further comprise at least one lens arrangement 9 arranged adjacent to the radiation input end 5 and/or the radiation output end 6 of the optical waveguide 4. The lens arrangement 9 may comprise one or several optical lenses. The lens(es) of the lens arrangement 9 may comprise one or several materials such as ZnSe, Ge, Si, AgBr, AgCl, or alloys thereof.

The thermal radiation may be transmitted to the optical waveguide 4, at the radiation input end 5, by means of an input lens arrangement 9a, as shown in FIGS. 2, 8, and 10. A mechanical fixture such as a cylindrical or V-shaped mechanical element may be used to place and maintain the radiation input end 5 of the optical waveguide 4 in the suitable position relative to the input lens arrangement 9a.

The thermal radiation signals may be transmitted to the sensor array 2, at the radiation output end 6, via an output lens arrangement 9b, as shown in FIGS. 2, and 9. The radiation output end 6 is, in other words, operatively connected to the sensor elements 3 of the sensor array 2 via the output lens arrangement 9b. The facet of the radiation output end 6 may be placed above, and aligned with, the output lens arrangement 9b, which is configured to direct the radiation signals to the sensor elements 3. A mechanical fixture such as a cylindrical or V-shaped mechanical element may be used to place and maintain the radiation output end 6 of the optical waveguide 4 in the suitable position relative to the output lens arrangement 9b.

The device 1 may comprise both an input lens arrangement 9a and an output lens arrangement 9b, as shown in FIG. 2.

The present invention furthermore relates to a thermal radiation detection system 10 comprising a thermal radiation detection device 1 according to the above, as well as at least one camera 11 and/or a guiding light source 12, see FIG. 13a. The camera 11 and/or the guiding light source 12 are arranged such that the optical axis O1 of the camera 11, and/or the optical axis O2 of the guiding light source 12, is/are located at a maximum distance d1 such as 2.5 cm or 1.7 cm, from the center axis CA of the optical waveguide 4 of the thermal radiation detection device 1, as shown in FIG. 13b. The camera 11 may be a front facing camera or a rear facing camera. The guiding light source 12 may be configured to emit infrared or visible light.

The camera 11 and/or the guiding light source 12 is/are configured to guide the user of the electronic device by providing a more accurate indication of the location of the thermal measurement area in question. In response to the illustrated guidance, the optical waveguide 4 can be oriented, by the user, in a particular direction, such that the optical waveguide 4 receives thermal radiation emitted only from a predefined area A3 on the radiation source 13.

The camera 11 may be used to capture an image of the radiation source 13, the display of the electronic device 14 subsequently showing the image with an indication of the detection area A3, as shown in FIG. 13c. The user of the electronic device 14 can thus move and adjust the device so that the optical waveguide 4, and hence the thermal measurement, is aimed at an area desired to be measured, such as the forehead of a person. This guide mode can be used for both front facing thermal measurement and rear facing thermal measurement. The guiding light source 12 is preferably used only during rear facing thermal measurement, since the light emitted by the guiding light source 12 points towards the area on the radiation source 13 where radiation is detected, as indicated in FIG. 13a.

The electronic device 14 comprises a housing 15 and the thermal radiation detection device 1, or the thermal radiation detection system 10, described above. The housing 15 encloses the thermal radiation detection device 1 or the thermal radiation detection system 10.

The housing 15 is provided with at least one thermally transparent opening 16, the transparent opening 16 being transparent to thermal radiation emitted by the radiation source 13, which radiation source 13 is located outside the housing 15, hence outside the electronic device 14. The transparent opening 16 may for example have a diameter as small as about 1 mm.

The transparent opening 16 may comprise an array of transparent sub-openings, the transparent sub-openings 16 being arranged in a two-dimensional pattern corresponding to the first two-dimensional pattern P1 of the radiation input end 5 of the optical waveguide 4, such that thermal radiation is transmitted to the input radiation end 5 of the optical waveguide 4 via the transparent sub-openings, as shown in FIGS. 11a to 12b. In one embodiment, shown in FIGS. 12a and 12b, each transparent sub-opening 16 tapers as it extends through the housing 15, preferably such that the smallest dimension d2, e.g. the smallest diameter, of the transparent sub-opening is arranged closest to the radiation input end 5 of the optical waveguide 4.

The transparent opening 16, or transparent sub-openings 16, is/are aligned with the radiation input end 5 of the optical waveguide 4 of the thermal radiation detection device 1 or the thermal radiation detection system 10, such that thermal radiation is transmitted to the input radiation end 5 of the optical waveguide 4 via the transparent opening 16, or transparent sub-openings 16. Embodiments of this is shown in FIGS. 5 to 7. FIG. 5 shows a linear array of transparent sub-openings 16 being arranged along a side edge of the electronic device 14. FIG. 6 shows a circular array of transparent sub-openings 16 being arranged in the front or rear housing surface of the electronic device 14. FIG. 7 shows a linear array of transparent sub-openings 16 also being arranged in the front or rear housing surface of the electronic device 14.

The transparent opening 16, or transparent sub-openings 16, may be sealed by a cover 17, the cover 17 comprising at least one of Si, Ge, and ZnSe material. The cover 17 is transparent to thermal radiation, and may be transparent to wavelengths in the mid-infrared spectrum, preferably wavelengths between 5 and 14 μm, wherein being transparent to thermal radiation means allowing the thermal radiation pass the cover 7 without substantial abortion of the thermal radiation or without substantial loss of thermal radiation energy.

As shown in FIGS. 5 to 7, the transparent opening 16, or the transparent sub-openings 16, may be arranged within a further opening 18 in the housing 15, such as any opening 18 accommodating e.g. the camera(s) 11, or a microphone, a light sensor, and/or an IR emitter 20. The further opening 18 has at least the same area size as the transparent opening 16. FIG. 5 shows an embodiment wherein the further opening 18 has a significantly larger area than the transparent sub-openings 16, while FIG. 6 shows an embodiment wherein the further opening 18 has an area size similar to that of the transparent sub-openings 16.

Figures 11A, 11B, 12A, 12B:
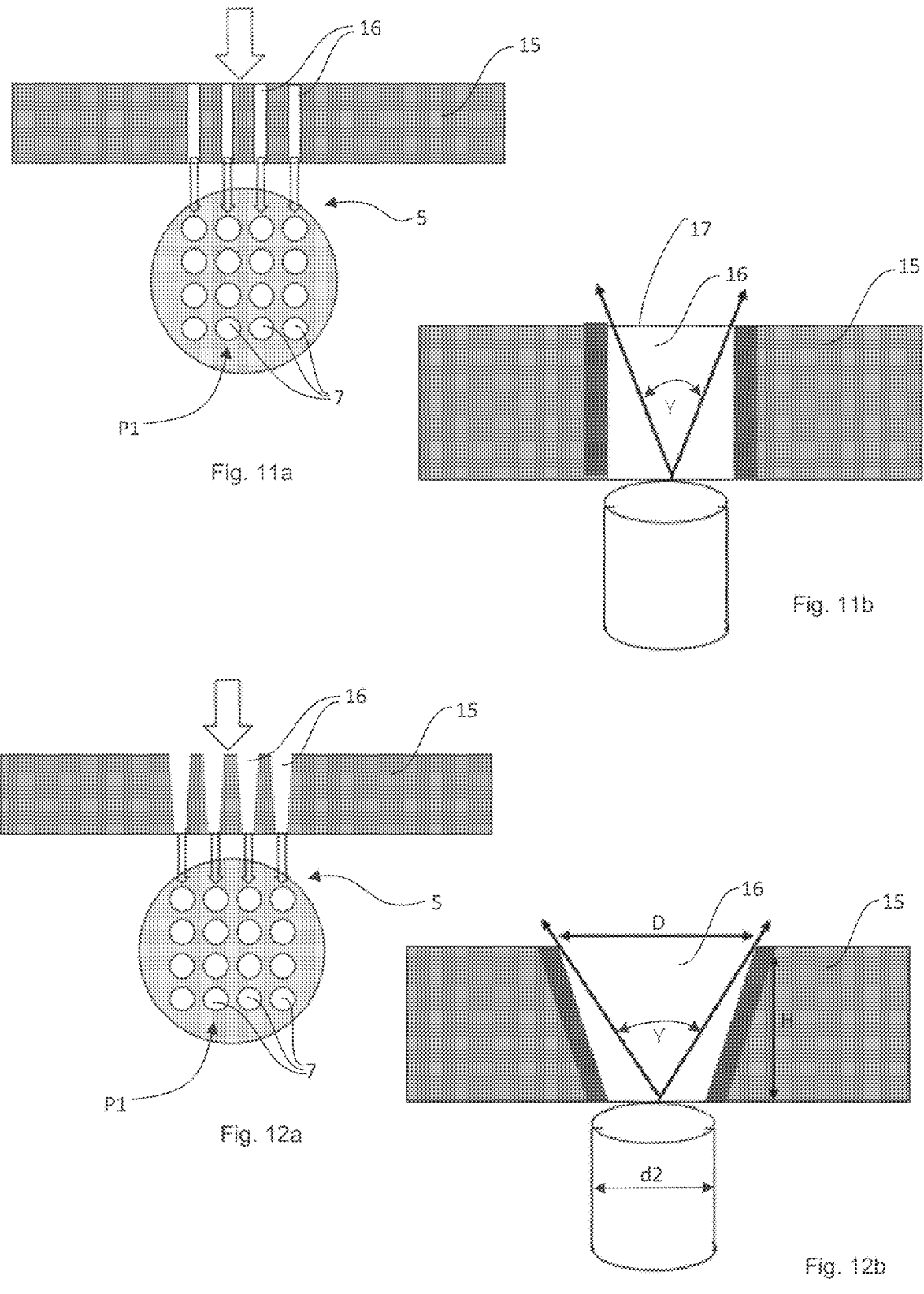
FIGS. 11a and 11b show partial cross-sectional views of an electronic device in accordance with an embodiment of the present invention.
FIGS. 12a and 12b show partial cross-sectional views of an electronic device in accordance with a further embodiment of the present invention.

As shown in FIGS. 11*b* and 12*b*, each transparent sub-opening 16 may have a field of view angle γ. In order to maximize the field of view angle γ, the transparent sub-openings 16 may be tapered, as mentioned above. The tapered transparent sub-openings 16 each have a height H and a diameter D, and the transparent sub-opening tapers such that thermal radiation is received, by the input radiation end 5 of the optical waveguide 4, at a maximum field of view angle $\gamma = 2 \times \arctan D/(2 \times H)$.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A thermal radiation detection device, comprising:
a sensor array comprising a plurality of sensor elements; and
an optical waveguide having a radiation input end and a radiation output end;
wherein said radiation input end is configured to receive thermal radiation;
wherein said radiation output end is operatively connected to said sensor array;
wherein said optical waveguide is configured to transmit said received thermal radiation as a plurality of simultaneous thermal radiation signals;
wherein said optical waveguide is comprised of a plurality of fibers, and each fiber of said plurality of fibers of said optical waveguide are arranged in a first two-dimensional pattern at said radiation input end, and in a second two-dimensional pattern at said radiation output end, said second two-dimensional pattern being different than said first two-dimensional pattern; and
wherein at least one of said radiation input end and said radiation output end of said optical waveguide comprises a reflective surface, wherein a main plane of said reflective surface extends at a first angle to a main thermal radiation path of said optical waveguide, and wherein said reflective surface is configured to fold said main thermal radiation path by a second angle within said optical waveguide.

2. The thermal radiation detection device according to claim 1, wherein said device is configured to detect thermal radiation having wavelengths within at least one of the infrared spectrum or the visible spectrum.

3. The thermal radiation detection device according to claim 1, wherein each sensor element is a semiconductor element.

4. The thermal radiation detection device according to claim 1, wherein said plurality of fibers of said optical waveguide comprises at least one bundle of monocore fibers.

5. The thermal radiation detection device according to claim 1, wherein said plurality of fibers of said optical waveguide comprises at least one multicore fiber.

6. The thermal radiation detection device according to claim 5, wherein each core of said multicore fiber of the said optical waveguide is operably connected to one sensor element, and wherein each core is configured to transmit one thermal radiation signal to one sensor element.

7. The thermal radiation detection device according to claim 1, wherein said radiation output end is arranged to at least partially enclose said sensor array, wherein said second two-dimensional pattern is divided into a first sub-pattern and a second sub-pattern, wherein said first sub-pattern is superimposed onto a first side of said sensor array, and wherein said second sub-pattern is superimposed onto a second, opposite side of said sensor array.

8. The thermal radiation detection device according to claim 7, wherein at least one of:
at least one of said first two-dimensional pattern or said second two-dimensional pattern comprises one of a rectangular or a circular core pattern; or
said first sub-pattern and said second sub-pattern comprises one of a two-dimensional rectangular or circular core pattern or a one-dimensional linear pattern.

9. The thermal radiation detection device according to claim 1, further comprising at least one lens arrangement arranged adjacent to at least one of said radiation input end or said radiation output end of said optical waveguide, such that at least one of:
said thermal radiation is transmitted to said optical waveguide, at said radiation input end, by means of an input lens arrangement; or
said thermal radiation signals are transmitted to said sensor array, at said radiation output end, via an output lens arrangement.

10. A thermal radiation detection system comprising:
a thermal radiation detection device comprising:
a sensor array comprising a plurality of sensor elements; and
an optical waveguide having a radiation input end and a radiation output end;
wherein said radiation input end is configured to receive thermal radiation;
wherein said radiation output end is operatively connected to said sensor array;

wherein said optical waveguide is configured to transmit said received thermal radiation as a plurality of simultaneous thermal radiation signals;

wherein said optical waveguide is comprised of a plurality of fibers, and each fiber of said plurality of fibers of said optical waveguide are arranged in a first two-dimensional pattern at said radiation input end, and in a second two-dimensional pattern at said radiation output end, said second two-dimensional pattern being different than said first two-dimensional pattern; and wherein at least one of said radiation input end and said radiation output end of said optical waveguide comprises a reflective surface, wherein a main plane of said reflective surface extends at a first angle to a main thermal radiation path of said optical waveguide, and wherein said reflective surface is configured to fold said main thermal radiation path by a second angle within said optical waveguide, and at least one of a camera or a guiding light source, wherein at least one of said camera or guiding light source are arranged such that an optical axis of said camera or an optical axis of said guiding light source is located at a maximum distance of 1.7 cm or 2.5 cm from a center axis of the optical waveguide of said thermal radiation detection device.

11. The thermal radiation detection system according to claim 10, wherein said guiding light source is configured to emit infrared or visible light.

12. The thermal radiation detection system according to claim 10, wherein at least one of said camera or said guiding light source is configured to provide an indication of an area to be measured on a radiation source, such that said optical waveguide can be oriented to receive thermal radiation emitted only from the area on the radiation source.

13. The thermal radiation detection system according to claim 10, wherein said thermal radiation detection device is configured to detect thermal radiation having wavelengths within at least one of the infrared spectrum or the visible spectrum.

14. The thermal radiation detection system according claim 10, wherein each sensor element is a semiconductor element.

15. The thermal radiation detection system according to claim 10, wherein said plurality of fibers of said optical waveguide comprises at least one bundle of monocore fibers.

16. The thermal radiation detection system according to claim 15, wherein each core of said bundle of monocore fibers of the said optical waveguide, is operably connected to one sensor element, and wherein each core is configured to transmit one thermal radiation signal to one sensor element.

17. The thermal radiation detection system according to claim 10, wherein said plurality of fibers of said optical waveguide comprises at least one multicore fiber.

18. The thermal radiation detection system according to claim 10, wherein said radiation output end is arranged to at least partially enclose said sensor array, wherein said second two-dimensional pattern is divided into a first sub-pattern and a second sub-pattern, wherein said first sub-pattern is superimposed onto a first side of said sensor array, and wherein said second sub-pattern is superimposed onto a second, opposite side of said sensor array.

* * * * *